March 2, 1948.                H. P. WILLIAMS                2,436,846
GLIDE PATH SYSTEM FOR AIRCRAFT
Filed Oct. 14, 1942
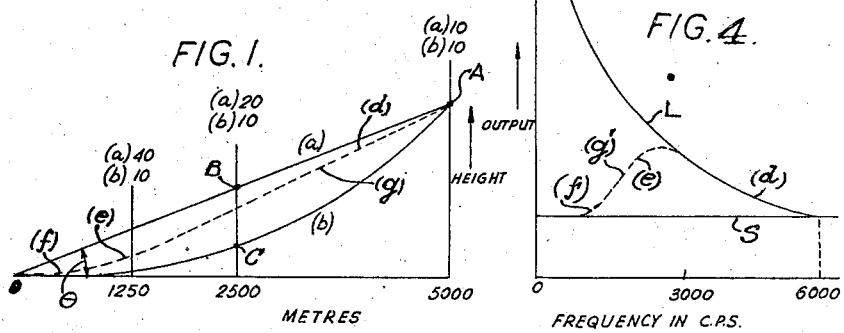
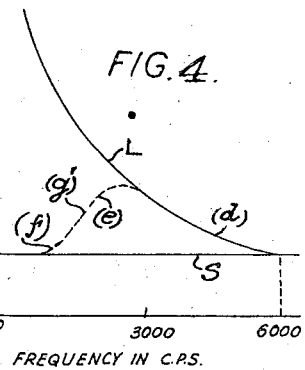
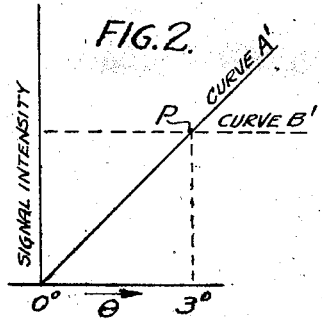
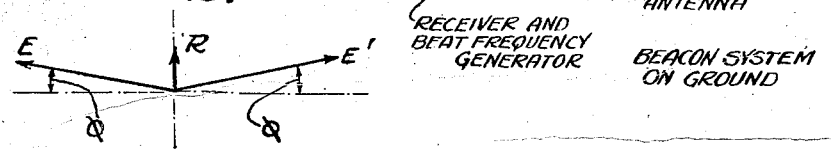
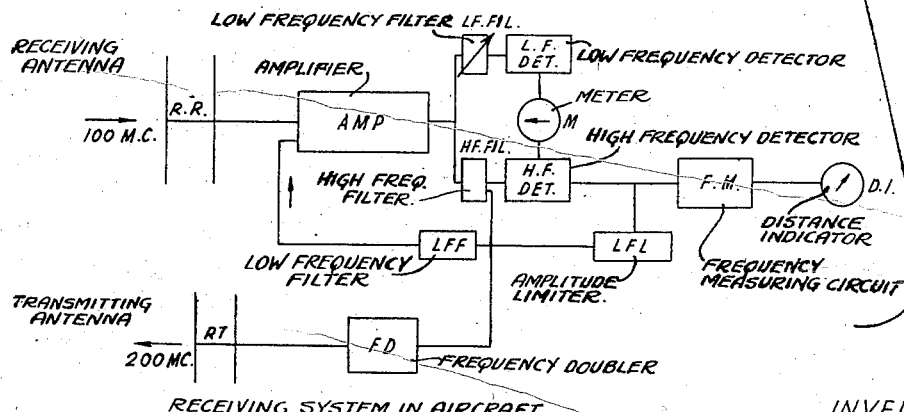
INVENTOR
H. P. Williams
BY Loyd Hall Sutton
ATTORNEY Patented Mar. 2, 1948

2,436,846

UNITED STATES PATENT OFFICE 2,436,846

GLIDE PATH SYSTEM FOR AIRCRAFT

Herbert Paul Williams, London, England, assignor to Standard Telephones and Cables Limited, London, England, a British company Application October 14, 1942, Serial No. 462,023
In Great Britain March 11, 1941

Section 1, Public Law 690, August 8, 1946
Patent expires March 11, 1961

18 Claims. (Cl. 250—1.68)

The present invention relates to glide path systems for aircraft.

Systems providing glide paths for landing aircraft usually require two overlapping beams of electromagnetic waves in order to indicate the glide path by means of the comparison of two signals. It is the object of the present invention to provide a simplified arrangement in which only one beam of electromagnetic waves is necessary.

According to the invention arrangements are provided for determining the distance of the arriving aircraft from a transmitter and for transmitting this information to the aircraft as an amplitude modulation of the beam of electromagnetic waves radiated from the transmitter, and on the aircraft means are provided for obtaining a derivative depending upon the frequency of said amplitude modulation and for comparing said derivative with the energy level of the beam to give an indication of the glide path.

In carrying out the invention in practice the waves of the beam are frequency modulated or swept cyclically at a predetermined rate for example, of the order of 50 periods per second. The beat frequency between the waves received at the transmitter after reflection or reradiation from the aircraft and the contemporaneous transmitted wave is, as is well known, a measure of the distance from the aircraft to the transmitter. At the transmitter, this beat frequency is used to amplitude modulate the transmitted wave. On the aircraft receiving arrangements are provided for receiving the amplitude and frequency modulated wave of the beam. The low frequency amplitude modulation is separated out and the detected low frequency and high frequency energies after suitable transformation are compared in an appropriate meter to give an indication of the glide path. The low frequency of the amplitude modulation is also passed to a frequency measuring device on the aircraft to indicate the distance of the aircraft from the transmitter.

The principle of operation of the invention will now be described with reference to the accompanying drawings in which:

Fig. 1 shows diagrammatically straight and square law glide paths in full line also an ideal glide path in broken line;

Fig. 2 is a curve of signal intensity plotted against angle of glide path for explaining the creation of a square law guide path;

Fig. 3 is a vector diagram used to explain the radiation from the antenna;

Fig. 4 shows the output characteristic of a low frequency filter with varying frequency; and Fig. 5 shows diagrammatically a radiating beacon system with associated receiving system and the receiving system on an aircraft.

*Creation of square law glide path*

Let us suppose we have a horizontal dipole antenna placed one to two wavelengths above the earth. Then, as is well known, there will be direct radiation from the dipole and reflected radiation from the earth which will appear as if it were coming from an image of the dipole in the earth. The results of the radiation from this image and from the original dipole will produce a field intensity pattern in the form of a polar diagram in the vertical plane which has a shape near the origin for small values of the angle $\theta$ between the radiation and the earth which always follows a square law. That is to say points of equal field strengths will lie at heights above the ground (represented by ordinates in Fig. 1) proportional to the squares of the horizontal distances from the origin (represented by abscissae in Fig. 1).

This square law feature arises from two facts:

(1) That the law of attenuation with distance is the inverse distance law; and (2) That the field strength increases materially and with height at a fixed given distance.

Let us assume, for instance, that we are moving from the point A (Fig. 1) to point B on the straight line curve (a), where the distance OA is substantially equal to twice the distance OB. Since we maintain the same angle $\theta$ to the antenna system, we are on the same angle of the polar diagram and therefore the field strength has increased to approximately twice the previous value.

If we wish to obtain the same field strength as at the point A, we must now move vertically downwards to a point C which has a height above the ground which is half the height of the point B above the ground. Then points A and C are on the same contour curve, i. e. they are on a curve of equal field strength.

Thus, for small angles of $\theta$ which, as is well known, are never greater than 5° for glide path angles, we have the height of the point B above the ground approximately half that of the point A and therefore the height of the point C is one-quarter that of the point A. A similar relationship can be shown between other points on the curve which obviously follows a square law.

Another very important way of looking at the radiation is by means of the curve of signal intensity plotted against the angle θ at a given distance from the aerial system which is as shown in Fig. 2. Where the dipole is placed not more than two wavelengths above the ground, the curve is virtually a straight line. This is because the component vectors from the two radiations (i. e. from the dipole direct and via the earth by reflection) are practically 180° out of phase so that their resultant varies linearly with the angle θ. This is indicated in Fig. 3 where $\phi = D \sin \theta$ (where D is the height of the dipole above the earth); $R = E + E'$; E and E' are the received signal voltage from the dipole and from the image, respectively. If θ is less than 5° and D is less than two wavelengths, then φ is proportional to θ and R is proportional to φ. Therefore R is proportional to θ.

A similar argument can be applied to a collection of antennas above the ground, provided the ground reflection is nearly perfect and that their height are not more than, say, two wavelengths from the ground.

Basic forms of glide path

Taking the square law radiation as shown in Fig. 1, it is obvious that if the transmitter output were to be kept constant, and if a receiver of constant gain were used on an aircraft, then such an aircraft could follow a square law path in space by maintaining a constant output from the receiver.

If, instead of maintaining a constant output at the receiver we compare it with a special voltage or comparison voltage whose magnitude is inversely proportional to the distance from the antenna system, and keep the two voltages balanced or in constant ratio, then the glide path would be a straight line into the origin O.

Such a comparison voltage would be represented by the horizontal dotted line B' in Fig. 2. The voltage would not depend on height (i. e. it is parallel to the θ axis of Fig. 2, but it would vary with distance from the origin). Now the angular position of curve A' (Fig. 2) also varies with the distance from the origin, and in the same manner, i. e. with the inverse distance law. That is, as distance from the antenna decreases the curve A' approaches the intensity axis. Therefore, the intensity value for curves A' and B' increases in magnitude in the same proportion as we go nearer to the origin of the radiation pattern. Therefore, their point of intersection, point P remains at the same value of θ; consequently we maintain the similar value of θ which is equivalent to taking a straight line into the origin O of the distribution pattern.

This can perhaps be seen more clearly from the facts that (1) for any given angle θ within the glide angle range of 0 to 5°, the field intensity I is inversely proportional to the distance r from the origin O, and (2) that the comparison voltage V is also inversely proportional to the distance r from the origin O.

That is $$Ir = \text{constant}$$
$$Vr = \text{constant}$$

so that $$\frac{Ir}{Vr} = \text{constant and } I/V = \text{constant}$$

which represents a straight line through the origin of the field distribution pattern.

Thus, if the ratio of I to V is maintained constant, preferably with V equal to I, then the receiver will follow a straight line into the origin.

Ideal shape of glide path

The two glide paths, (a), linear and (b), inverse square, described above may be regarded as the two extreme cases of glide path. The case actually desired is of the form shown at (g) in Fig. 1 from which we see that the shape is straight over portion (d) and then curves over the edge of the airport at portion (e). On reaching a height of, say ten feet above the airport, it would then remain at this height across the length of the runway, as at portion (f). There is, however, no objection to the height coming in solely towards the origin in the manner of the square law curve since the decrease of height with distance would be relatively gradual over this portion.

In order to achieve this ideal shape, the point of intersection of curves A' and B' of Fig. 2 should vary with θ as the plane comes in towards the origin. This variation of the relative strengths of curves A' and B' can be achieved if we have a distance measuring device creating a low frequency in the plane which is a function of the distance, and if the said low frequency is passed through filters so as to obtain the proper law.

Let us suppose, first of all, that we have a filter whose output is inversely proportional to frequency, and that the input of this filter is always at a constant level. The output from this filter is then used for comparison against the received field strength, i. e. for comparison against curve A' of Fig. 2. If the frequency input represents distance, the output of the filter is therefore inversely proportional to distance, so that the curves A' and B' of Fig. 2 alter at the same rate as we approach the distribution origin O, thereby giving a straight line into the origin because the intersection at P remains at a constant angle θ. The response curve of this imaginary filter is shown as curve L in Fig. 4. If the output from the filter were constant and independent of the frequency, then we should have curve S, so that if such an output as that represented by S were used for comparison with the received field strength, we should merely follow a constant field strength curve, and thus fly on a square law glide path marked (b) on Fig. 1. The correct law for the comparison voltage, as obtained via a low frequency filter has the shape indicate by (g') in Fig. 4. It will be noticed that (g') has portions corresponding to (d), (e), and (f) of Fig. 1. While (d) approximates the L curve, (f) joins the S curve and (e) is the intermediate region.

If the shape of (g') is considered more carefully, it will be found that the height of the bump on the curve is approximately twice the height of curve S above the zero level. Thus the law of filter action required is quite practical.

To summarize, if we have a source of low frequency in the receiver of constant amplitude but of variable frequency (the frequency being a function of distance from the transmitter) and whose output is passed through a filter of characteristic similar to that shown by curve (g') in Fig. 4, then a comparison of this point with the received signal strength will produce an ideal glide path of the shape shown by curve (g) in Fig. 1. For instance, it will be noticed that the comparison voltage at 3,000 meters is double that at 6,000 meters, so that the pilot of an aircraft in attempting to balance up this increase voltage at 3,000 meters must fly twice as high as he would at a constant field path in order to receive a field strength twice as great as that obtained at 6,000 meters from the transmitter. In this way he remains on the curve (g) instead of following curve (b).

If desired the shape of the glide path may be made adjustable by adjusting the characteristic of the low frequency pass filter which forms a part of the receiver in the aeroplane. Such a filter may be a π or T-network and the adjustment may consist in varying the constants of the filter so as to give a maximum response at a desired frequency and so vary the position of the broken line characteristic shown in Figure 2.

The transmission frequency may conveniently be for example 3 metres, i. e. 100 mc./s. This is for distance determination and amplitude modulated about 20% by the distance frequency. If the distance to be measured lies between the extremes of 5,000 meters (the outer marker) and 500 meters (after the point of contact with the ground) then the resultant audio distance frequencies produced are in the range 6,700 cycles to 670 cycles.

Method of creating comparison voltage

It will now be shown how the hypothetical voltage referred to above can be created in practice.

This may be done by obtaining a low frequency whose amplitude is kept constant by a limiter (say an overloaded valve whose plate supply is regulated by a neon tube or cold cathode stabilizer). The low frequency voltage is therefore a square wave voltage and not sinusoidal. This will affect the shape of the filter characteristic that we require (because of the presence of harmonics in the output), but can be taken into account in the design, since the amplitude of the fundamental and lower harmonics will bear a constant relationship with each other if the overloading is arranged to be considerable.

The variation of frequency with distance from the origin is obtained by employing methods analogous to that used in altimeter technique. The output from the transmitter is frequency modulated and the reflection received from the aircraft, and the beat frequency is obtained between a portion of the ground transmitter output and the received reflection to give a low frequency which is a measure of the distance of the aircraft from the origin. This low frequency is then superposed on the transmitter as an amplitude modulation in addition to the frequency modulation already existing. Therefore, the information in the form of a low frequency is conveyed to the receiver on the aircraft.

It is proposed in the invention to overcome any difficulties of reflections from other objects from the aircraft by causing the aircraft to re-radiate some of the received signal at double frequency (i. e. there is a frequency doubler on the aircraft receiver which re-radiates with the output of, say, 2 watts). This re-radiated double frequency is then mixed with a portion of the ground transmitter output which is also passed through a doubler stage. Thus, the low frequency modulation will be controlled only by the re-radiation from the aircraft and so the effect of spurious reflections is eliminated, and only aircraft which have received permission to land will have this re-radiated portion of the set switched on.

If the system were adapted on centimetre waves, a sharp enough beam to obtain the necessary reflections without re-transmission at the plane and frequency doubling is possible, but the frequency of the order of the 3 metres is probably more convenient in practice taking into account experience with centimetre waves.

Transmitter

The transmitter arrangements are shown diagrammatically in Fig. 5. T represents a transmitter located on the ground at the airport and having a carrier wave frequency, for example, of 100 mc. and is frequency modulated ±1 megacycle at 50 p. p. s. The transmitter feeds into a radiating antenna system RT. RR is a receiving antenna system for receiving twice the frequency of transmission. RR feeds into receiver R which is also fed through a frequency doubling stage D from the transmitter T. The output from R is fed to amplitude modulate the output from T and RT as described. Arrangements for doing this are well known and further description here is deemed unnecessary.

Receiver

The circuit arrangements of one example of receiver for cooperation with the transmitter described, said receiver being located on an aircraft, are also diagrammatically shown in Fig. 5. In this figure, it will be noticed that straight high frequency amplification is employed in amplifier Amp. The received field strength will be very high so that the amplification required to obtain an output of say 20 volts should only be of the order of 10,000. Some of this output voltage after passing through a high frequency filter, H.F.FIL, is then fed to a single frequency doubler valve FD which then feeds energy to the radiating antenna system RT at twice the frequency. A convenient layout of the aerials is obtained with an antenna system on both wings, one (RR) for receiving and the other (RT) for transmitting. Since the transmitting wavelength is one half that of the received wave interaction between the antenna system RR and RT would be negligible in any case.

Another portion of the D. C. component of the amplified signal from the amplifier AMP after detection in the high frequency detector H.F.DET is compared in meter M with the D. C. component obtained by feeding a portion of the amplified signal from the amplifier AMP through a low frequency pass filter L.F.FIL to a low frequency detector L.F.DET and thence to the meter. As hereinbefore stated, by varying the constants of the low frequency pass filter L.F.FIL, the slope of the glide path shown in broken line in Figure 1, or the point at which the glide path meets the ground, can be varied, other factors, of course, remaining constant.

The low frequency component in the output of the high frequency detector H. F. DET is passed through a frequency measuring circuit FM which operates a distance indicator DI. This distance measuring meter DI also serves to give an indication that the system is functioning properly and should have a good psychological effect. Some of the low frequency component is passed through an amplitude limiting stage LFL after which it is passed through an appropriate low frequency pass filter LFF to the input of the amplifier AMP. Now a characteristic of limiting circuits is that their outputs are substantially constant for wide changes in input. Therefore, the problem of keeping the gain of the high frequency amplifier constant is reduced to that of keeping the high voltage plate supply to the limiting circuit constant. This limiting action is, of course, quite impermissible in constant field strength amplifiers.

Since the required output from the limiting device LFL is of the order of 20-50 volts, there is no difficulty in keeping this constant by means of a neon tube or equivalent device together with a series resistance in known manner.

*Method of overcoming changes in receiver gain*

It will be noticed that the principles outlined so far assume that we receive a signal from a transmitter whose output is monitored on the ground so as to be as constant as possible, and that this received signal is compared with a comparison voltage governed by a low frequency from the filter. Even if we assume perfect control of the low frequency reference level, we are still faced with the fact that variations in the receiver would affect the final comparison. In other words, we should have the usual disadvantage associated with a constant field strength type of glide path. In the present invention, this disadvantage is overcome in the following simple manner. The reference low frequency is greatly attenuated by the filter LFF, and this attenuated voltage is injected into the input of the receiver amplifier together with the signals received on the antenna. Since the proposed transmission frequency is of the order of 100 megacycles and the low frequency injected in addition is below 10 kilocycles. It is easy to keep these two frequencies distinct and separate by means of mixed loads in the anode circuit of the high frequency amplifier. In this manner, the received high frequency signals and the reference low frequency signal are virtually compared at the input to the amplifier, for changes in gain in the amplifier valves will affect each in the same proportion.

The stability of the system, therefore, depends on two main facts: (1) that the transmitter output should be monitored to be as constant as possible, and (2) that the reference low frequency voltage before entering the low frequency filter should be as constant an amplifier as possible caused by the limiting action of a neon tube or cold cathode device. The first of these requirements is necessary in the constant field strength system, and, in fact, in any system it is necessary to monitor the output of the transmitter, although it is not always necessary to control the output as well. Since this is done by ground equipment, the operation can be made very definite and reliable. The second requirement takes the place of that normally required for a constant field strength system, and is far more easily achieved for a given accuracy. A set designed for constant gain may easily show differences in gain of as much as three db, whereas a voltage stabilizer can easily be designed to reduce this figure.

*Distance indicator*

One of the by-products of this system is that a distance indicator can be fitted on to the aircraft to indicate distance from the transmitter beacon. This would use the normal counter circuit fed by rectified low frequency, as indicated in Figure 5. With such a distance indicator, the need for marker beacons is greatly diminished, or they could be avoided altogether, if desired. When there is no re-radiation for an aircraft in the process of gliding down, the low frequency modulation on the transmitter could be left set at a high value such that the distance indicator would be off scale on any aircraft receiver. If, therefore, an aircraft receiver was switched on to the glide path, the distance meter would take up a value indicating its distance from the beacon if this distance was within range of the meter. Obviously, a meter with a scale in the nature of a logarithmic law would be most convenient for this purpose.

In use the pilot of an aircraft as soon as he gets near enough to the airport to receive the transmission from the directional antenna will observe the result of the ratio of the signal intensity to the comparison voltage as determined by the distance component. He will then maintain the aircraft at such a height that the ratio will always equal a predetermined constant. If the ratio increases he will know that he must bring his aircraft down, and if it decreases he will know that he must bring his aircraft up. When the constant ratio is maintained on the indicator he will follow the glide path down to the landing field.

A unique advantage of the system described is that the pilot can preset his glide path to suit the prevailing conditions and the behaviour of his plane.

Other advantages of this system are:

(1) A highly stabilised receiver is not needed.

(2) Although a comparison method, the shape of the glide path is not a straight line into the aerial system, but can be made to approach the ideal shape.

(3) Centimetre wavelengths are not necessary.

(4) The shape of the glide path is adjustable from the aeroplane itself.

(5) No off-setting of the transmitter with respect to the landing direction is required.

(6) The same transmitter may be used for both approach and glide paths.

(7) No marker beacons are required.

Whilst the invention has been described in relation to one embodiment thereof given by way of example, it will be understood that other embodiments will occur to those skilled in the art and all of which fall within the invention as defined by the appended claims.

What is claimed is:

1. A glide path system for aircraft comprising on the ground a directional antenna system for transmitting a beam of electromagnetic waves, a source of high frequency carrier waves coupled to said antenna system, means for receiving electromagnetic waves radiated from an aircraft under observation in response to the interception of said waves transmitted by said antenna system, means for deriving from said received waves a component dependent upon the instantaneous distance of said aircraft from said directional antenna system, and means for amplitude modulating said waves transmitted from said antenna system in accordance with said component, and comprising on the aircraft receiving means for deriving from said received modulated carrier waves a component dependent upon said degree of amplitude modulation, and for deriving another component dependent upon the carrier wave energy level, and means for comparing said two last mentioned components to determine a glide path.

2. A glide path system for aircraft comprising on the ground a directional antenna system for transmitting a beam of electromagnetic waves, a source of high frequency carrier waves coupled to said antenna system, means for receiving said waves after reflection by an aircraft under observation, means for deriving from said reflected waves a component dependent upon the instantaneous distance of said aircraft from said transmitting equipment, and means for amplitude modulating said transmitted waves in accordance with said last mentioned component, and comprising on the aircraft receiving means for deriving from said received modulated carrier waves a component dependent upon said degree of amplitude modulation, and deriving another component dependent upon the carrier wave energy level, and means for comparing said two last mentioned components to determine a glide path.

3. A glide path system for aircraft comprising on the ground a directional antenna system for transmitting a beam of electromagnetic waves, a source of high frequency waves, means for frequency-modulating said waves cyclically at a predetermined periodicity and for applying them to said antenna system, means for receiving frequency modulated waves radiated from an aircraft under observation in response to the interception of said waves transmitted by said antenna system, means for combining said received waves and said directly transmitted waves to obtain beat frequency waves, and means for amplitude modulating said frequency modulated waves in accordance with said beat frequency waves, and comprising on the aircraft means for receiving the amplitude and frequency modulated waves, means for separating out the low frequency wave component of the beat frequency amplitude modulation, means for detecting said low frequency wave component and for detecting the high frequency carrier wave component and means for comparing said two derived components in an indicating instrument to determine the glide path.

4. A glide path system for aircraft comprising on the ground a directional antenna system for transmitting a beam of electromagnetic waves, a source of high frequency waves, means for frequency-modulating said waves cyclically at a predetermined periodicity and for applying them to said antenna system, means for receiving said frequency modulated waves after reflection by an aircraft under observation, means for combining said reflected waves and said directly transmitted waves to obtain beat frequency waves, and means for amplitude modulating said frequency modulated waves in accordance with said beat frequency waves, and comprising on the aircraft means for receiving the amplitude and frequency modulated waves, means for separating out the low frequency wave component of the beat frequency amplitude modulation, means for detecting said low frequency wave component and for detecting the high frequency carrier wave component, and means for comparing said two derived components in an indicating instrument to determine the glide path.

5. A glide path system according to claim 3 wherein a frequency measuring device is provided on the aircraft and means is provided for applying said low frequency wave component to said measuring device to give an indication of the distance of the aircraft from the transmitter.

6. A glide path system according to claim 3 wherein frequency multiplying means is provided on said aircraft for multiplying the frequency of the received carrier waves, and transmitting means is provided thereat for retransmitting said frequency multiplied waves, and means is provided on the ground for multiplying the frequency of a portion of the energy of said source of high frequency waves to a like degree and for combining said last-mentioned multiplied waves with the waves received after they have been retransmitted by said aircraft.

7. A glide path system according to claim 3 comprising a high frequency amplifier on said aircraft, means for impressing received waves on said amplifier, means for passing a portion of the output of said amplifier through a low-pass filter and a detector to derive said low-frequency wave component, and means for passing another portion of the output of said amplifier through a high pass filter and a further detector to derive said high frequency carrier wave component.

8. A glide path system according to claim 3 comprising a high frequency amplifier on said aircraft, means for impressing received waves on said amplifier, means for passing a portion of the output of said amplifier through a low-pass filter and a detector to derive said low-frequency wave component, means for passing another portion of the output of said amplifier through a high pass filter and a further detector to derive said high frequency carrier wave component, and means for varying the characteristics of said low-pass filter to vary the shape of the glide path.

9. A glide path system according to claim 3 comprising a high frequency amplifier on said aircraft, means for impressing received waves on said amplifier, means for passing a portion of the output of said amplifier through a low-pass filter and a detector to derive said low-frequency wave component, means for passing another portion of the output of said amplifier through a high pass filter and a further detector to derive said high frequency carrier wave component, a limiting device, a further low-pass filter and means for feeding a portion of the output of said further detector to the input of said amplifier over said limiting device and said further low-pass filter.

10. A glide path system for aircraft comprising on the ground a directional antenna system for transmitting a beam of electromagnetic waves, a source of high frequency carrier waves coupled to said antenna system, means for receiving the electromagnetic waves radiated from an aircraft under observation in response to the interception by said aircraft of said waves transmitted by said antenna system, means for deriving from said received waves a component dependent upon the instantaneous distance of said aircraft from said directional antenna system, and means for transmitting said component to said aircraft, and comprising on the aircraft means for receiving said electromagnetic carrier waves from said antenna system on the ground, means for receiving said transmitted component, and means for comparing said component with the energy level of said carrier waves to determine a glide path.

11. A glide path system for aircraft in accordance with claim 10 in which said component dependent upon the instantaneous distance of said aircraft from said directional antenna system is transmitted to said aircraft from said antenna system.

12. A glide path system for aircraft in accordance with claim 10 in which said component dependent upon the instantaneous distance of said aircraft from said directional antenna system is transmitted to said aircraft as a characteristic of said transmitted carrier waves.

13. A glide path system for aircraft in accordance with claim 10, in which said transmitted electromagnetic waves are frequency modulated in a predetermined cyclic manner and in which said component dependent upon the instantaneous distance of said aircraft from said directional antenna system is derived from a comparison between the frequency of said transmitted electromagnetic waves and the frequency of the waves received from said aircraft.

14. A glide path system for aircraft in accordance with claim 10, in which said component dependent upon the instantaneous distance of said aircraft from said directional antenna system is an alternating wave whose frequency varies with the distance and in which the means for comparing said component with the energy level of the received carrier waves includes means to change the value of said component with frequency according to a predetermined law whereby the curve of the glide path may be changed in a predetermined manner.

15. A glide path system for aircraft comprising means to determine the distance of an aircraft from a ground station, means to radiate from said ground station a beam of electromagnetic waves in the direction of said aircraft, means under control of said distance determining means to produce on said aircraft a component which varies in a predetermined manner with the distance of said aircraft from said station, means on said aircraft to receive said electromagnetic waves, and means to compare said component with the energy level of said received waves to determine a value indicating the vertical position of said aircraft with respect to a predetermined glide path.

16. A glide path system for aircraft according to claim 15 in which the means to determine the distance of the aircraft from the ground station is located at the ground station and the indication of distance is transmitted to the aircraft.

17. The method of indicating a glide path for an aircraft which comprises transmitting a beam of electromagnetic waves from a ground station in the direction of an aircraft, receiving said waves on said aircraft, determining the instantaneous distance of said aircraft from said ground station, utilizing the distance so determined to produce a component having a value which varies with distance in accordance with a predetermined law, and comparing said component with the energy level of said received electromagnetic waves to produce an indication of the vertical position of said aircraft with respect to a predetermined glide path.

18. The method of providing a glide path for aircraft which comprises radiating a beam of electromagnetic waves from a predetermined position on the ground in the general direction of an approaching aircraft, radiating electromagnetic waves from said aircraft in response to said first mentioned waves intercepted by said aircraft, receiving the waves radiated from said aircraft, comparing the waves so received with said first mentioned transmitted waves to derive a component representing the instantaneous distance of said aircraft from said predetermined ground position, transmitting said component to said aircraft, receiving on said aircraft said component and said transmitted waves, attenuating said received component of distance of said aircraft from said ground position according to a predetermined law, and comparing the resultant of said attenuation with the energy level of said received transmitted waves so as to obtain a value which will be dependent on the height of the aircraft from the ground.

HERBERT PAUL WILLIAMS.

REFERENCES CITED

The following references are of record in the file of this patent:

UNITED STATES PATENTS

| Number | Name | Date |
|---|---|---|
| 2,268,587 | Guanella | Jan. 6, 1942 |
| 2,196,674 | Hahnemann et al. | Apr. 9, 1940 |
| 2,272,997 | Alford | Feb. 10, 1942 |